US010500930B2

United States Patent
Frederick et al.

(10) Patent No.: US 10,500,930 B2
(45) Date of Patent: Dec. 10, 2019

(54) VEHICLE DOOR GLASS DAMPING AND VEHICLES INCLUDING VEHICLE DOOR GLASS DAMPING SYSTEMS

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 53 days.

(21) Appl. No.: 15/864,364

(22) Filed: Jan. 8, 2018

(65) Prior Publication Data
US 2019/0210432 A1    Jul. 11, 2019

(51) Int. Cl.
  *B60J 1/20*      (2006.01)
  *E05F 7/04*      (2006.01)
  *E05F 15/70*     (2015.01)

(52) U.S. Cl.
  CPC ............... *B60J 1/2097* (2013.01); *E05F 7/04* (2013.01); *E05F 15/70* (2015.01); *E05Y 2900/55* (2013.01)

(58) Field of Classification Search
  CPC . E05F 15/70; E05F 7/04; E05F 11/382; E05F 11/525; B60J 1/2097; E05Y 2201/222
  See application file for complete search history.

(56) References Cited

U.S. PATENT DOCUMENTS

| 1,402,017 | A | * | 1/1922 | Russell | B60J 1/2097 292/155 |
| 1,438,209 | A | * | 12/1922 | Attwood | B60J 1/2097 292/155 |
| 1,521,916 | A | * | 1/1925 | Tulloch | B60J 1/2097 49/377 |
| 1,536,929 | A | * | 5/1925 | Richardson | B60J 1/2097 292/83 |
| 1,597,837 | A | * | 8/1926 | Staley | B60J 1/2097 292/150 |

(Continued)

FOREIGN PATENT DOCUMENTS

| DE | 1020004019482 | 11/2005 |
| KR | 20090118339 | 11/2009 |
| KR | 101575533 | 12/2015 |

*Primary Examiner* — Justin B Rephann
(74) *Attorney, Agent, or Firm* — Dinsmore & Shohl LLP

(57) ABSTRACT

Embodiments described herein generally relate to a vehicle door glass damping system that functions like a clamp along a perimeter of a door glass when the door glass is in a closed position. The system includes an actuator assembly having a motor housing and a plunger. The assembly is configured to apply a force in the vehicle lateral direction force to a perimeter edge of the door glass. A plurality of actuator assemblies may be provided about the perimeter of the door glass at multiple locations. The actuator assembly may be a single touch location or may touch off on the whole perimeter of the door glass. When the door glass is displaced, a sealing member body within a glass run channel pivotally compresses which creates a compression seal between the sealing member body and the exterior surface of the door glass.

20 Claims, 6 Drawing Sheets

(56) References Cited

U.S. PATENT DOCUMENTS

| | | | | |
|---|---|---|---|---|
| 2,047,047 | A * | 7/1936 | Wirth | B60J 1/2097 49/377 |
| 4,094,100 | A * | 6/1978 | Fukumoto | B60J 1/17 49/348 |
| 4,669,221 | A * | 6/1987 | Ugawa | E05F 11/382 49/352 |
| 4,730,414 | A * | 3/1988 | Nakamura | E05F 11/382 49/348 |
| 4,785,582 | A * | 11/1988 | Tokue | E05F 11/382 49/211 |
| 4,956,942 | A * | 9/1990 | Lisak | B60J 1/17 49/212 |
| 5,009,461 | A * | 4/1991 | Smith-Horn | B60J 1/14 296/146.2 |
| 5,018,305 | A * | 5/1991 | Kuki | B60J 1/17 49/348 |
| 5,802,671 | A * | 9/1998 | Ikuma | E05F 5/022 16/82 |
| 5,927,021 | A * | 7/1999 | Kowalski | B60J 5/0416 296/146.5 |
| 6,061,890 | A | 5/2000 | Shashlo et al. | |
| 6,283,534 | B1 * | 9/2001 | Mrozowski | E05F 11/525 296/146.2 |
| 6,561,567 | B2 * | 5/2003 | Mrozowski | E05F 11/525 296/146.11 |
| 7,937,894 | B2 * | 5/2011 | Renke | E05F 7/04 49/348 |
| 10,190,355 | B2 * | 1/2019 | Bombardella | E05F 15/60 |
| 2002/0008404 | A1 * | 1/2002 | Mrozowski | E05F 11/525 296/146.2 |
| 2014/0150207 | A1 * | 6/2014 | Hattori | E05F 5/022 16/82 |
| 2016/0089962 | A1 | 3/2016 | Kuroki | |
| 2017/0028831 | A1 * | 2/2017 | Yamada | B60J 1/2097 |
| 2018/0094470 | A1 * | 4/2018 | Sase | E05F 11/38 |

* cited by examiner

VEHICLE DOOR GLASS DAMPING AND VEHICLES INCLUDING VEHICLE DOOR GLASS DAMPING SYSTEMS

TECHNICAL FIELD

The present specification generally relates to vehicle door glass damping systems and, more specifically, to vehicles including vehicle door glass damping systems that have door glass displacement features for use in damping door glass vibrations.

BACKGROUND

Automotive OEMs exert great effort to improve aerodynamics and noise reduction capabilities for vehicles. A primary area for noise transmission is through door glass. The transitions from the pillar surfaces to the door glass may also be a source of aerodynamic inefficiency. As one possible solution, door glass may be thickened or made into acoustic glass to improve sound damping. However, this thickening of the door glass can be expensive and can add weight to the vehicle. Door glass run technology is improving to reduce glass vibration as well, but this improvement can be limited by the need for ease of glass sliding. A main concern for aerodynamics, noise and vibration may be particularly present when the glass is in the closed position.

Accordingly, there is a need for improving aerodynamics and noise reduction capabilities for vehicles at the door glass without modifying the door glass and without modifying the door glass run.

SUMMARY

A vehicle includes a vehicle door. The vehicle door includes a door glass that is slidably attached to the vehicle door. The vehicle further includes a control unit. An actuator assembly is operably connected to the control unit. The actuator assembly includes a motor housing and a plunger. The plunger is operably coupled to the motor housing such that the plunger is movable between a retracted configuration and an extended configuration. The plunger of the actuator assembly displaces the door glass in a vehicle lateral direction in the extended configuration.

In another embodiment, a vehicle door includes a door glass that is slidably attached to the vehicle door. The vehicle door includes a control unit. An actuator assembly is operably connected to the control unit. The actuator assembly has a motor housing and a plunger. The plunger extends from the motor housing. The plunger has a first end and a second end. The first end of the plunger is operably coupled to the motor housing, the second end of the plunger is configured to make contact with the door glass. The second end of the plunger is configured to apply a force against a position on the door glass upon an actuation by the actuator assembly that displaces the door glass in a vehicle lateral direction.

In yet another embodiment, a method of damping a door glass of a vehicle door is provided by first mounting an actuator assembly having a motor housing and a plunger in a cavity defined by a door frame portion and a door frame cover portion. A control unit is configured to determine when the door glass is in a closed position. When the door glass is determined to be in the closed position, the control unit activates the actuator assembly which extends the plunger a distance to apply a force against a plurality of predetermined positions on the door glass that moves an edge of the door glass in a vehicle lateral direction.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to a vehicle door glass damping system that clamps along a perimeter of a door glass when the door glass is in a closed position. The vehicle door glass damping system includes an actuator assembly that includes a motor housing and a plunger that moves relative to the motor housing. The actuator assembly is configured to use the plunger to apply a lateral force to an edge of the door glass when the door glass is in the closed position. Multiple actuators may be provided about a perimeter of the door glass at multiple locations. The actuator assemblies have a single touch location or may touch off along one or more edges or the entire perimeter of the door glass. For example, the vehicle door glass damping system may use an elongated structure such as a bar that is connected to the plungers that can touch off along a length of an edge of the window glass.

The actuator assemblies can be motorized and the vehicle door glass damping system may receive an input from the window regulator or sensor to determine when the door glass is in the closed position so to determine whether or not to activate/deactivate the actuator assemblies. The terms "motorized" or "motor" refers to a device that can impart motion. The actuator assemblies may use a distance and/or an amount of force so to control the actuator assemblies and the plunger engagement with the door glass. When the vehicle door glass is detected as being in the closed position, the vehicle door glass damping system activates the actuator assemblies to extend the plunger so to apply a lateral force against the vehicle door glass. The force displaces the glass laterally into increased contact with a glass run sealing member which can create an increased engagement between the glass run sealing member and the door glass compared to if no lateral force is applied by the actuator assemblies.

Figure 1:
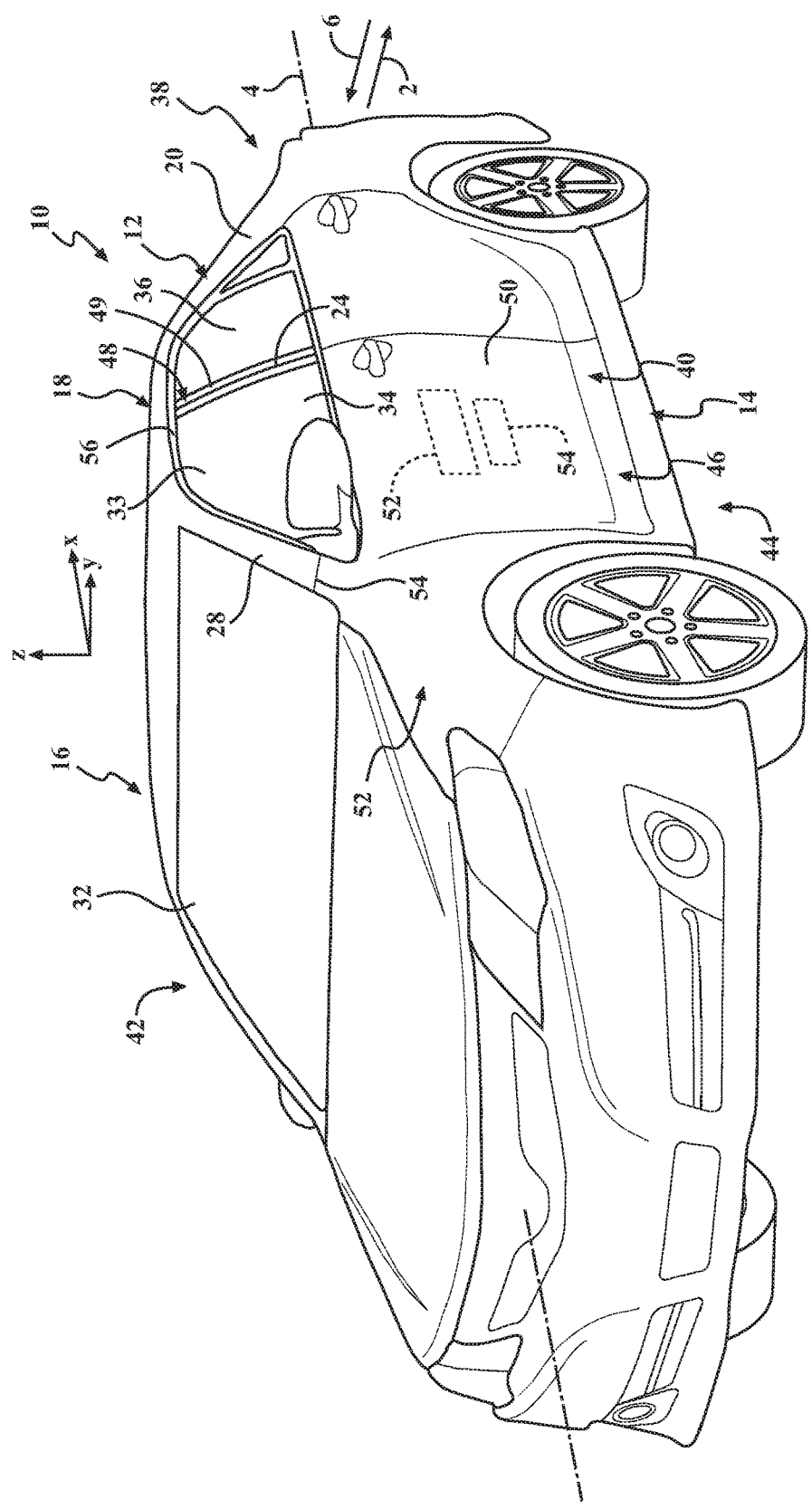
FIG. 1 schematically depicts a perspective view of a vehicle, according to one or more embodiments shown or described herein.

As used herein, the term "vehicle longitudinal direction" refers to the forward-rearward direction of the vehicle (i.e., in the +/−vehicle X-direction depicted in FIG. 1). The term "vehicle lateral direction" refers to the cross-vehicle direction (i.e., in the +/−vehicle Y-direction depicted in FIG. 1), and is transverse to the vehicle longitudinal direction. The term "vehicle vertical direction" refers to the upward-downward direction of the vehicle (i.e., in the +/−vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

Motor vehicles that incorporate elements according to the present disclosure may include a variety of construction methodologies that are conventionally known, including a unibody construction methodology as well as a body-on-frame construction methodology. It should be understood that vehicles that are constructed with body-on-frame or unibody construction may incorporate the elements that are shown and described herein.

Referring to FIG. 1, the vehicle 10 includes a vehicle body 12 including a body framework 14 that includes a pair of side roof rail structures 16 and 18 and various pillar assemblies. The various pillar assemblies are connected to the side roof rail structures 16 and 18 and extend downwardly therefrom in a vehicle vertical direction. These pillar assemblies are generally referred to as a C-pillar assembly 20, B-pillar assembly 24 and a front or A front pillar assembly 28. The front pillar assemblies 28 are located toward the forward end of the vehicle 10, generally between a front windshield 32 and front side windows 33. The B-pillar assemblies 24 are located generally between the front side windows 33 and rear side window 36 of the vehicle 10. Finally, the C-pillar assemblies 20 are located between the rear side window 36 and rear window 38 of the vehicle. Depending on vehicle type, other pillar assemblies, such as D-pillar assemblies may be located rearward of the C-pillar assemblies 20.

Figure 2:
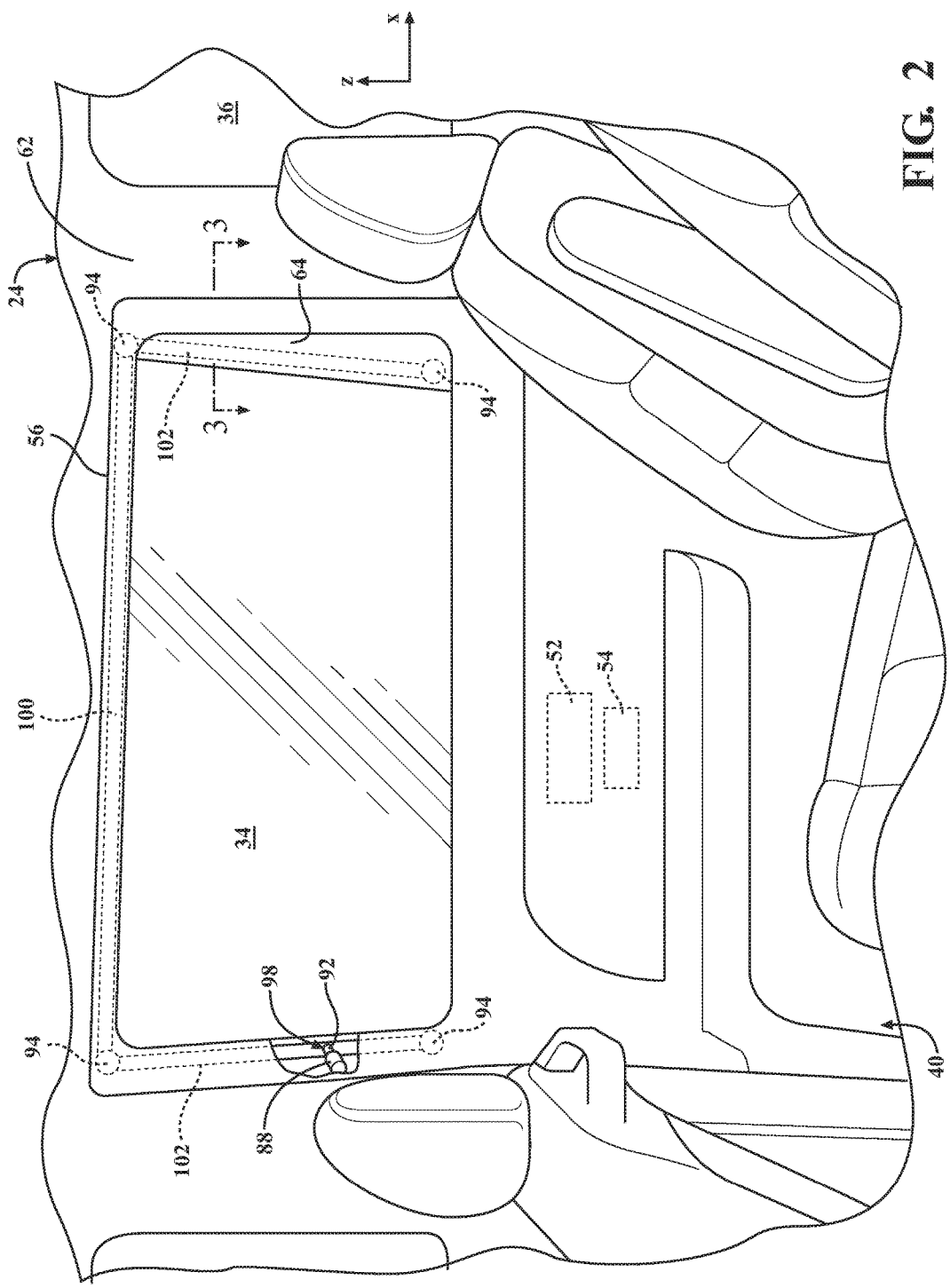
FIG. 2 illustrates a side perspective view of a door and glass assembly for the vehicle of FIG. 1, according to one or more embodiments shown or described herein.
Figure 3:
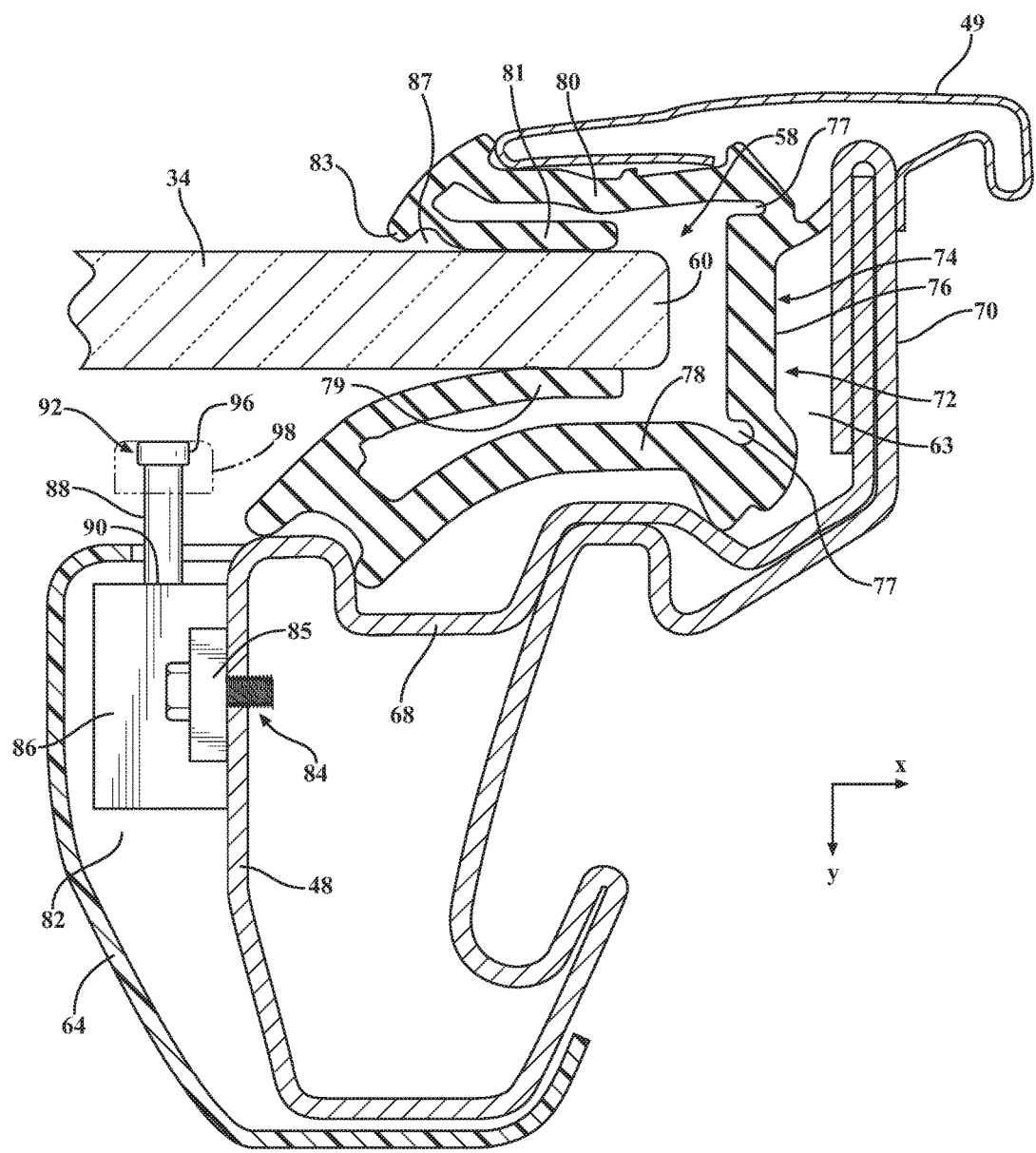
FIG. 3 illustrates an isolated cross sectional view of the door and glass assembly of FIG. 2 before a door glass is displaced, taken from line 3-3, according to one or more embodiments shown and described herein.

Referring to FIGS. 1, 2 and 3, vehicle doors 40 are provided at each side 42 and 44 of the vehicle 10. The vehicle doors 40 include a door body portion 46 and a door frame portion 48 that extends from the door body portion 46 in the vehicle vertical direction. The door body portion 46 and the door frame portion 48 may be formed of inner and outer panels. Between the inner and outer panels 50, a window regulator assembly, generally referred to as element 52, and a control unit, generally referred to as element 54 may be provided. The window regulator assembly 52 may be connected to a lower edge of a door glass 34. The window regulator assembly 52 may be motor-driven to move the door glass 34 between closed and open configurations. In other embodiments, the door glass 34 may be moved manually. The door frame portion 48 includes an upper portion 56 that provides a glass run channel 58 that can receive an edge 60 of the door glass 34. Generally, on the outermost surface of the door frame portion 48 is a garnish portion 49.

The control unit 54 may be operably connected to the window regulator assembly 52. Further, the control unit 54, may also be operably connected to other controls of the vehicle, such as, without limitation, the serial BUS of the car and other window regulators.

Referring to FIGS. 2 and 3, the B-pillar assembly 24 within passenger compartment is covered with an applique 62 or a door trim piece. The applique 62 is a decorative member configured to be fastened to the B-pillar assembly 24 or to the door frame portion 48, so to provide styling and functionality to the vehicle. The applique 62 may extend from the B-pillar assembly 24 in a vehicle lateral direction and travel the length of the B-pillar assembly 24 in a vehicle vertical direction. The interior of the vehicle door 40 further includes a door frame cover portion 64. The door frame cover portion 64 is attached to the door frame portion 48.

FIG. 3 illustrates a cross section view of the of the door frame portion 48 taken from line 3-3 at a height along the B-pillar assembly 24. The door frame portion 48 may be formed as a channel member 63 that includes the door frame cover portion 64 and the garnish portion 49. The door frame cover portion 64 is attached to an inner surface of the door frame portion 48 while the garnish portion 49 is generally mounted to an outer surface of the door frame portion 48.

The glass run channel 58 may be generally formed by the door frame portion 48 and the garnish portion 49. That is, the door frame portion 48 may include a longitudinal portion 68 that extends generally in the vehicle vertical direction and a lateral portion 70 that extends in the vehicle vertical direction. The garnish portion 49 may extend generally in the longitudinal direction and also generally in the vehicle vertical direction.

A glass run sealing member 72 may be located in the glass run channel 58. The glass run sealing member 72 may include a sealing member body 74 that extends along an edge portion 76, an interior side portion 78 and an exterior side portion 80 of the glass run channel 58. The edge portion 76 may extend generally in the vehicle lateral direction and may encompass the edge of the door glass 34 when the door glass 34 is in the closed position. Further, the edge portion 76 may include a pair of indent portions 77 where the interior side portion 78 and the exterior side portion 80 meet the edge portion 76 so to allow the glass run sealing member increased flexibility and bend when the door glass 34 is closed. In other embodiments, one or more of the edge portion 76, the interior side portion 78 and the exterior side portion 80 may be formed separately and connected to the others.

A first finger portion 79 extends from the interior side portion 78 of the glass run sealing member 72. The first finger portion 79 and the interior side portion 78 are pivotally spaced apart from one another so to not be in contact with each other. The first finger portion 79 extends into a path of the door glass 34 to make contact with an inner surface of the door glass 34 adjacent to the edge 60. The first finger portion 79 resiliently reflects when the door glass 34 is in a closed position such that there is contact between the door glass 34 and a portion of the first finger portion 79.

A second finger portion 81 extends from the exterior side portion 80 of the glass run sealing member 72. The second finger portion 81 and the exterior side portion 80 are pivotally spaced apart from one another so to not be in contact with each other. The second finger portion 81 expands into a path of the door glass 34 to make contact with an outer surface of the door glass 34 adjacent to the edge 60. The second finger portion 81 includes a tip portion 83 at an end. A notch 87 is disposed between the tip portion 83 and the second finger portion 81. The second finger portion 81 expands into the path if the door glass 34 to make contact with the door glass 34 when the door glass is in the closed position while the notch and the tip may not be in contact with the door glass 34.

With reference to FIGS. 2 and. 3, the door frame cover portion 64 extends from the door frame portion 48 in a vehicle lateral direction generally to meet with an edge of the applique 62 (FIG. 2) so to provide for a cavity 82 between the door frame portion 48 and the door frame cover portion 64. The cavity 82 is generally near the edge perimeter of the door glass 34. The cavity 82 extends from the door frame portion 48 and travels in a vehicle vertical direction. The cavity 82 may generally run in a vehicle vertical direction the height of a glass area of the door.

An actuator assembly 84 is mounted to the door frame portion 48 within the cavity 82 using a fastener 85, such as, without limitation, a bolt and nut or a screw. The actuator assembly 84 is operably connected to the control unit 54 (FIG. 1). The actuator assembly 84 generally includes a motor housing 86 and a plunger 88. The actuator assembly 84 is connected to a power source, such as a power BUS. It should be appreciated that the actuator assembly 84 is not limited to being electrically powered, such as by an electric motor, but may be pneumatic, hydraulic, and/or magnetic.

The plunger 88 extends from the motor housing 86 and has a first end 90 and a second end 92. The first end 90 is mounted to the motor housing 86. The second end 92 is configured to make contact with the door glass 34. In a preferred embodiment, when the actuator assembly 84 is activated, the second end 92 of the plunger 88 makes contact with the edge 60 of the door glass 34 in an area hidden by the door frame cover portion 64 and/or the door frame portion 48. For example only, the plunger 88 may make a single point of contact 94 in the four corners of the door glass 34 as shown in FIG. 2. The actuator assembly 84 is configured to activate the plunger 88 by extending the second end 92 of the plunger 88 into contact with the edge 60 of the door glass 34 in a generally vehicle lateral direction at a distance from the motor housing 86 and with a force applied to the door glass 34.

The second end 92 of the plunger generally includes a head portion 96. The head portion 96 may have varying shapes and thicknesses. For illustrative purposes, the second end 92 is illustrated with an enlarged head portion. Many other shapes are contemplated, such as a square head portion or an irregular-shaped head portion. The head portion 96 may be a different material and/or include a different material than the plunger 88, such as, without limitation a rubber or flocking soft tip, for example, to reduce noise and/or hard contact with the door glass 34 during operation.

The actuator assembly 84 may be located in a plurality of positions along within the cavity 82 so to position the second end 92 of the plunger 88 along the edge 60 of the door glass 34. Furthermore, the second end 92 of the plunger 88 may make contact with any edge along the perimeter of the door glass 34. It should be appreciated that more than one actuator assembly may be used. A plurality of actuator assemblies 84 may be positioned within the cavity 82. Further, the plurality of actuator assemblies 84 may surround the door glass 34 in areas between the door frame portion 48 and the door frame cover portion 64 or hidden along the door frame portion 48 by the garnish portion 49 or the applique 62. In a non-limiting example, the plurality of actuator assemblies 84 would follow a radius or a curve in the door glass 34 along a header portion of the door glass 34. The plurality of actuator assemblies 84 may be positioned along the perimeter of the header in such a position as to when the glass is closed, the plurality of actuator assemblies 84 may make contact with the edge of the door glass 34 while still remaining out of view of someone sitting in the interior of the vehicle 10. That is, the actuator assemblies 84 position so to be hidden by the door frame cover portion 64, applique 62, and/or garnish portion However, it should be appreciated that the plurality of actuator assemblies 84 may need not be hidden to function.

In another embodiment, a cable (not shown) may be connected to a motor (not shown) mounted to the door frame portion 48 and may be covered by the door frame cover portion 64. The cable may be routed through the glass run channel 58 and attached to the upper portion 56 so that the cable extends in the vehicle vertical direction. The plunger and/or the plurality of plungers 88 may be attached to a pivot member (not shown) and/or a plurality of pivot members. When the motor recoils the cable, a tension on the cable forces the pivot members to rotate. The rotation of the pivot member rotates the plunger 88. As the plunger 88 rotates, the door glass 34 may function as a cam surface for the plungers 88 until the plunger is rotated into a lateral position so to apply the force on the door glass 34 in the vehicle lateral direction.

An elongated contact member, such as a bar 98 (e.g. a c-channel) may be connected to the actuator assembly 84 or the plurality of actuator assemblies. The head portion 96 of the second end 92 of the plunger 88 may be coupled to the bar 98 or to the c-channel. In a non-limiting example, a fastener, such as a screw, a nut and bolt, or an adhesive would provide enough strength to maintain the coupling of the plunger to the bar. In another non-limiting example, the coupling between the plunger 88 and the bar 98 may be loose so to allow the bar 98 to float. It should also be appreciated that the bar 98 does not need to be attached to the plungers 88 but instead a plurality of springs (not shown) may be attached to the bar 98 so to move the bar 98 towards and/or away from the door glass 34.

The bar 98 or the c-channel is configured to make contact with the edge 60 of the door glass 34 along a perimeter in the vehicle longitudinal direction such that the contact of the bar is dispersed over an area of the door glass 34. Each actuator assembly 84 is configured to extend the plunger 88 the distance and with a similar force. However, it should be appreciated that the distance and/or the amount of force may be controlled and varied by the control unit 54. The bar 98 would generally apply the force along a geometric plane with reference to the door glass 34. It should also be appreciated that the bar 98 may be positioned so as to make contact with the door glass 34 in a vehicle longitudinal direction, such as across the header edge 100 as shown in FIG. 2 or in a vehicle vertical direction such as along the side perimeter edge 102 of the door glass 34 as shown in FIG. 2.

It should be appreciated that the plurality of actuator assemblies 84 with the bar 98 attached as discussed above may be positioned so to make contact anywhere along the header edge 100, the side perimeter edges 102 and/or the bottom edge of the door glass 34. Further, multiple bars may be positioned along separate side perimeter edges 102, the header edge 100, or the bottom edge and/or in the alternative, multiple bars may be positioned along the same edge of the door glass 34. Moreover, the bar 98 may be angled in a corner so to apply the force to two or more edges of the door glass 34.

It should also be appreciated that the actuator assembly 84 may function in conjunction with the plurality of actuator assemblies 84 that are attached to the bar 98. For example, as discussed above, the plurality of actuator assemblies 84 with the bar 98 attached may be positioned the header edge 100, the side perimeter edges 102 and/or the bottom edge of the door glass 34 and the actuator assembly 84 having the plunger 88 may be positioned along a different edge, and/or, in the alternative, may be positioned along the same edge as the bar 98.

Figure 4:
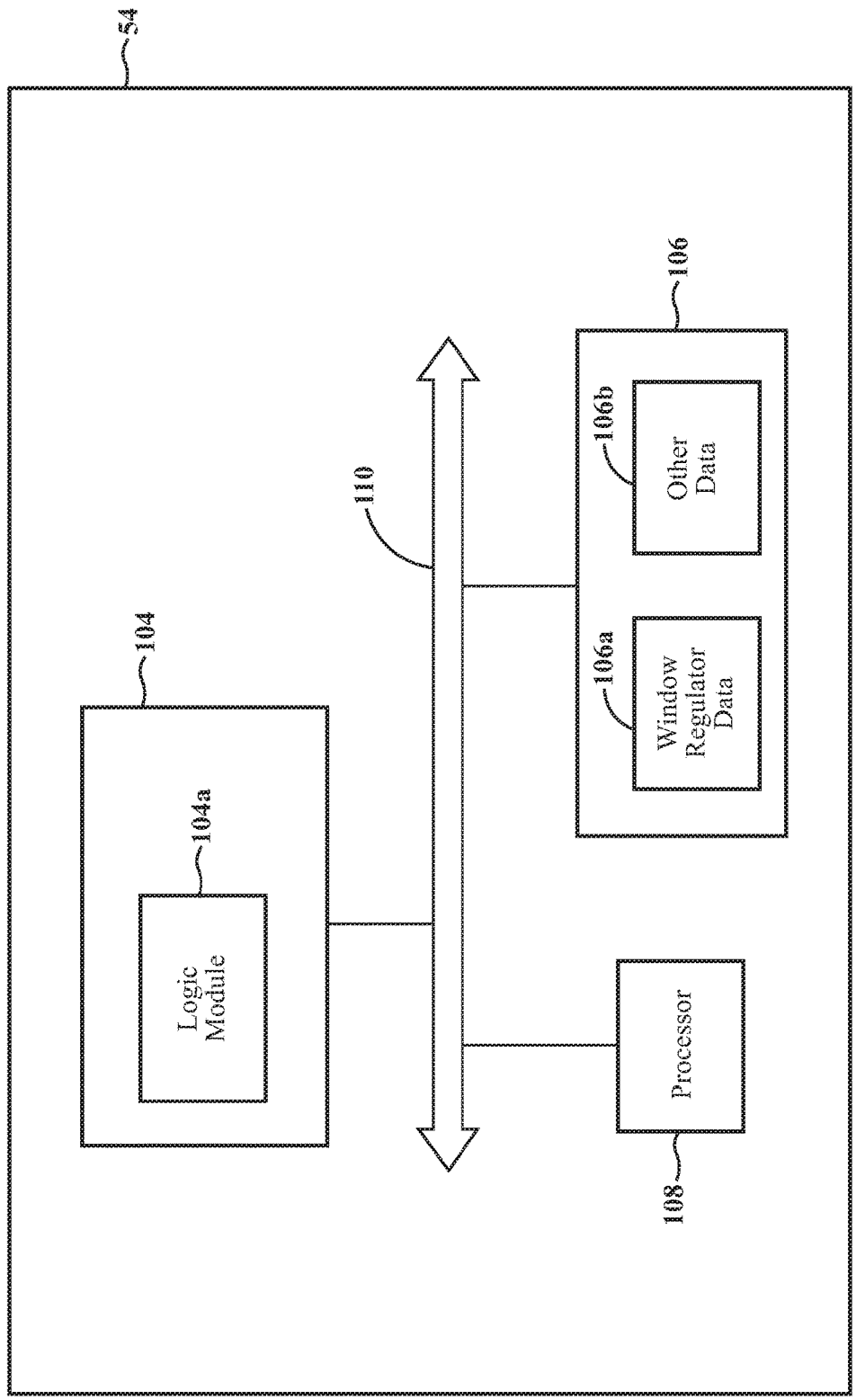
FIG. 4 schematically depicts a system for determining whether the door glass is in a closed position, according to one or more embodiments shown or described herein.

Referring to FIG. 4, the control unit 54 is depicted. The control unit 54 includes a memory component 104, an input component 106, a processor 108, and a local interface 110.

In some embodiments, the processor 108 includes processing components operable to receive and execute instructions (such as from the memory component). The memory component 104 stores the logic module 104a. The logic module 104a includes a plurality of different pieces of logic, each of which may be embodied as a computer program, firmware, and/or software/hardware. The logic module 104a is executable by the processor 108. The logic module 104a may have a plurality of preset programming choices with each of the plurality of preset programming choices executed by the processor 108. It should be appreciated that the logic module 104a may be edited or modified to change any of parameters therein. Moreover, the edits may automatically occur from data transmitted to the process or from an outside influence, such as a human programmer.

The input component 106 may be configured to look for an input from a window regulator assembly register 106a. It should be appreciated the input component 106 is not limited to looking for the input from only the window regulator assembly register 106a but may also look for inputs from a plurality of sensors 106b that may be positioned around the door glass 34 or the vehicle door 40. For instance, one or several proximity switches may be positioned so to detect whether the window is in the closed position. The input component 106 may be in communication with the window regulator assembly 52 so that when the door glass 34 is in a closed position, the window regulator assembly 52 may transmit a particular output to the input component 106 and is received in the window regulator assembly register 106a. When the door glass 34 is in a non-closed position, the window regulator assembly 52 may transmit a different output to the input component 106.

Once any input is received in the input component 106, the logic module 104a determines whether to instruct the processor 108 to activate the actuator assembly 84. Upon this activation, the actuator assembly 84 extends the plunger 88 at the predetermined distance and at the predetermined force into the door glass 34, as will be described in more detail below. The input component 106 constantly monitors the output of the window regulator assembly 52, or any other sensor, to determine whether the door glass 34 position has changed from the closed position.

It should be appreciated that the processor 108 may command a third unit, such as a pneumatic pump or a hydraulic unit, to pneumatically activate the actuator assembly 84. Therefore, the driving signal to the actuator should not be limited to the electric signal. It should also be appreciated that the control unit 54 including the processor 108, the logic module 104a and the input component 106 may be configured to control the plurality of actuator assemblies 84 and every door and door glass 34 within the vehicle 10 may have its own control unit or, in the alternative, each door or each door glass may have a dedicated control unit.

The local interface 110 is implemented as an Ethernet connection, DeviceNet, a bus or other communication interface to facilitate communication among the components of the control unit 54. Further, the local interface may control the actuator assembly and/or plurality of actuation assemblies.

It should be understood that while the components of FIG. 4 are illustrated as residing within the control unit 54, this is merely an example thereof. In some embodiments, one or more of the components may reside external to the control unit 54. It should also be understood that while the control unit 54 is illustrated as a single device, this is also merely an example. In some embodiments, the logic module 104a may reside on different computing devices.

Figure 5:
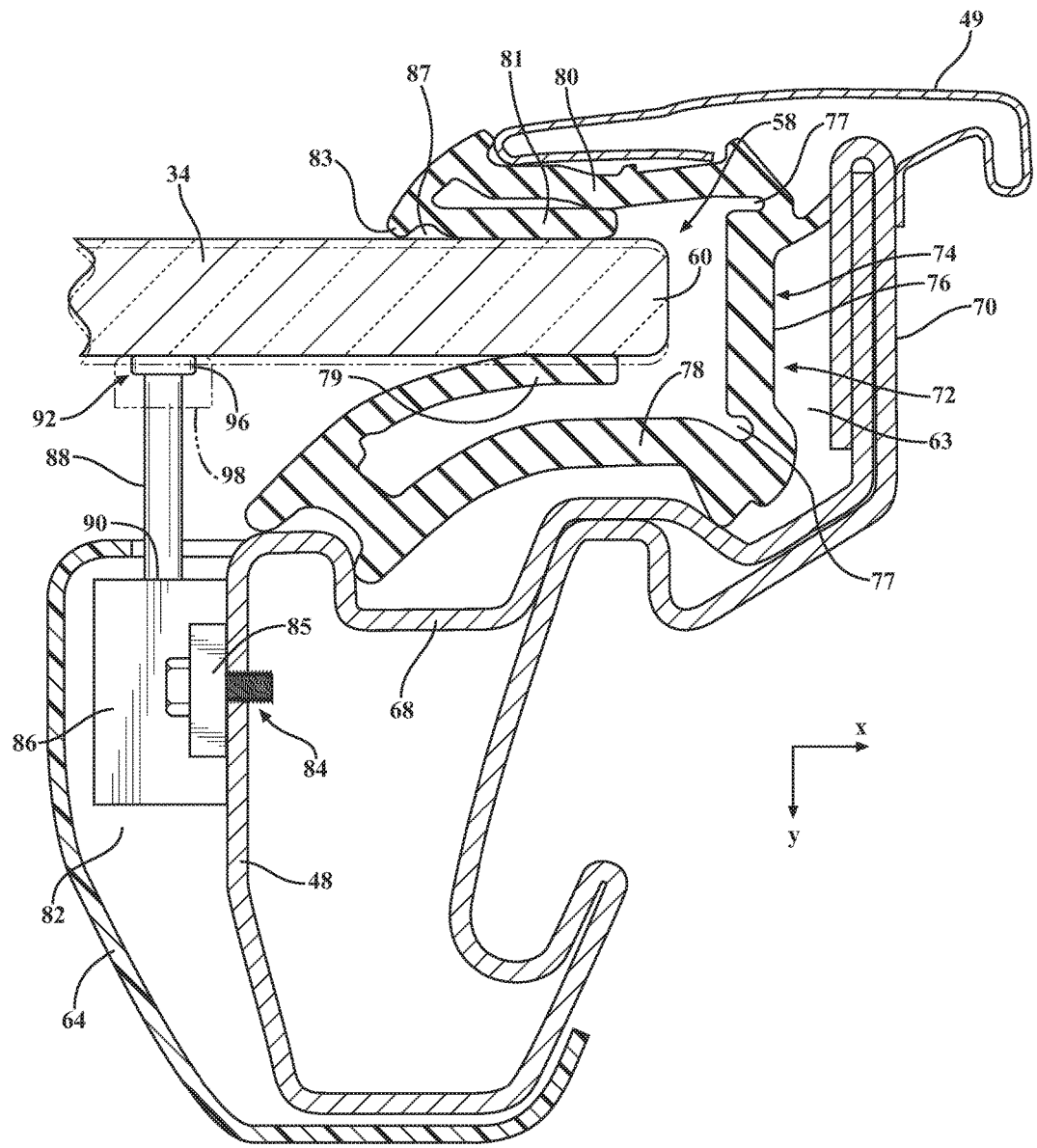
FIG. 5 illustrates an isolated cross sectional view of the door and glass assembly of FIG. 2 after the door glass is displaced, taken from line 3-3, according to one or more embodiments shown and described herein.

Now referring to FIG. 5, a schematic illustration of the door glass 34 displaced is depicted. The control unit 54 has detected that the door glass 34 is in a closed position and has activated the actuator assembly 84. The actuator assembly 84 has extended the plunger 88 so to make contact with the edge 60 or around a perimeter of the edge of the door glass 34. It should be appreciated that the distance may be established by several factors including, without limitation, the placement of the actuator assembly 84, the type of vehicle, the type of glass, etc. Further, it should also be appreciated that the force may be established by a number of factors including, without limitation, the outside environment such as a colder temperature versus a warmer temperature.

With the door glass 34 in the closed position and the plunger 88 extended, the head portion 96 of the plunger 88 makes contact with the door glass 34. This contact causes the door glass 34 to displace in the vehicle lateral direction from its normal position into the exterior side portion 80 of the sealing member body 74. Specifically, the second finger portion 81 is pivoted into the exterior side portion 80 in a vehicle lateral direction so to make contact with an inside surface of the exterior side portion 80. This contact prevents the second finger portion 81 from pivoting beyond the surface of the door glass 34. In other words, the second finger portion 81 can maintain contact with the outside surface of the door glass 34 when displaced because the exterior side portion 80 prevents the second finger portion 81 form over extending. The tip portion 83 is pivoted so to make contact with the door glass 34. The tip portion 83 provides additional pressure against the glass run channel 58 and maintains the pivoting of the second finger portion 81 into the edge 60 of the door glass 34.

The first finger portion 79 maintains contact with the inner surface of the edge 60 of the door glass 34. Further, the arcuate in shape of the first finger portion 79 allows the portion the first finger portion 79 to maintain its contact with the door glass after displacement.

It should also be appreciated that the actuator assemblies 84 may be positioned on the exterior surface of the door glass 34 so that when the door glass 34 is in the closed position, the plunger 88 extends in a vehicle lateral direction displacing the door glass 34 inward. This contact may cause the door glass 34 to make an increased contact with the interior side portion 78 of the sealing member body 74. Specifically, the first finger portion 79 may be pivoted into the interior side portion 78 in a vehicle lateral direction.

Figure 6:
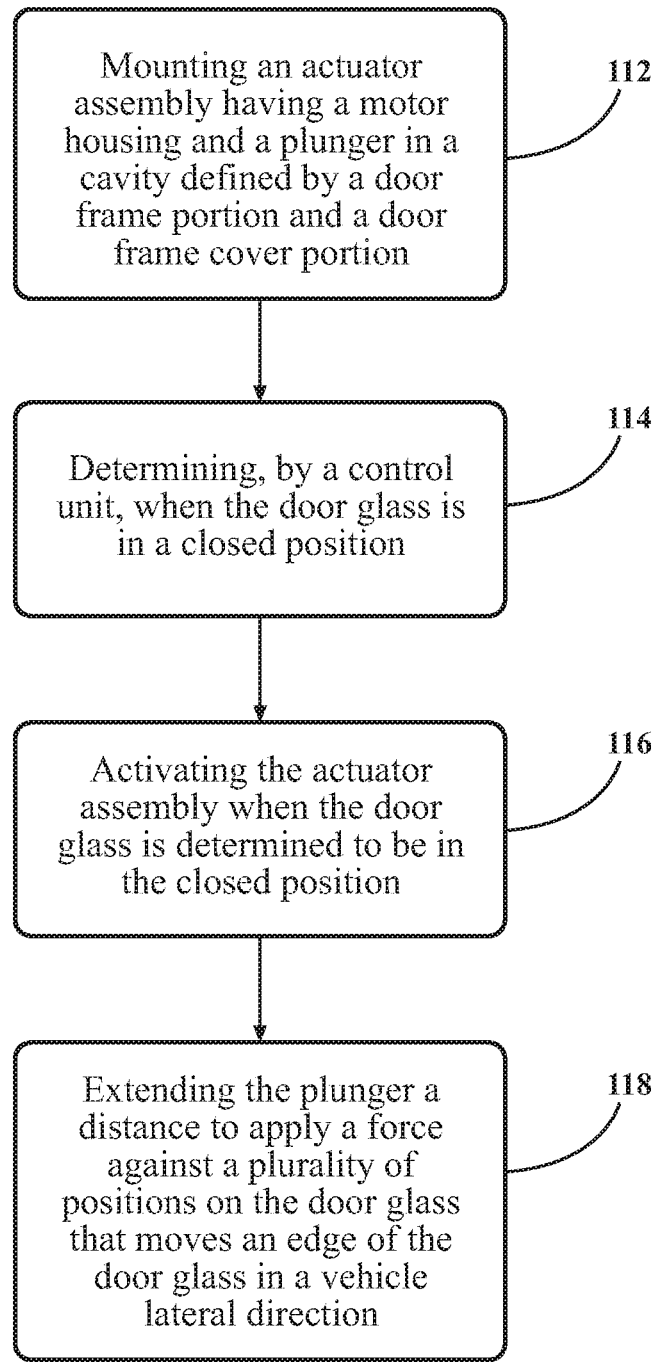
FIG. 6 illustrates a flowchart for a method of displacing the door glass according to one or more embodiments shown and described herein.

Now referring to FIG. 6, one method to produce the displacement of the door glass 34 in the vehicle lateral direction involves: mounting the actuator assembly having the motor housing 86 and the plunger 88 in a cavity 82 defined by a door frame portion 48 and a door frame cover portion 64 at 112; determining, by the control unit 54, when the door glass 34 is in a closed position at 114; activating the actuator assembly 84 when the door glass 34 is determined to be in the closed position at 116; and extending the plunger 88 a distance to apply a force against a plurality of positions on the door glass 34 that moves an edge 60 of the door glass 34 in the vehicle lateral direction.

The method of claim 15, the door further comprising a glass run channel that receives an edge of the door glass with the door glass in the closed position, the glass run channel having a glass run sealing member located therein, the plunger displaces the edge of the door glass into the glass run sealing member.

It should be appreciated that whether the actuator assembly 84 or the plurality of actuator assemblies 84 are being used around a region covered by the plungers 88, the glass displacement is configured to pivotally manipulate the sealing member body 74 so to create a compressive seal between the outer surface of the door glass 34 and the second finger portion 81 and tip portion 83. For example, when the plurality of actuator assemblies 84 attached to the bar 98 and the bar is extended into the side perimeter edge 102 of the door glass 34. the bar 98 will displace the entire region of the door glass 34 that the bar 98 makes contact against. As a result, the second finger portion 81 and tip portion 83 will pivotally make contact with the door glass 34 in a vehicle vertical direction for at least the length of the bar 98.

It should also be appreciated that whether the actuator assembly 84 and/or the plurality of the actuator assemblies and the plunger 88, plurality of plungers, and/or the bar 98 is used to displace the door glass 34 in the vehicle lateral direction, the exterior surface of the door glass 34 may create a smooth exterior surface with the exterior side portion 80. Moreover, the displacement provides for a better compressive seal that may prevent air, and other outside influences, from entering the glass run channel 58. As a result, the compressive seal improves the aerodynamic efficiency of the vehicle by preventing the outside air to cause drag on the door glass 34, the sealing member body 74 and/or the glass run channel 58. Furthermore, by displacing the door glass 34 into the sealing member body 74, the door glass 34 has a positive pressure applied against it, thus reducing the amount of vibration transmitting through the door glass 34. As a result, unwanted noise and harshness levels generally heard in a moving vehicle are also reduced.

The above-described vehicle door glass damping assemblies are configured to displace the door glass 34 in a vehicle lateral direction so to reduce the amount of vibration transmitting through the door glass 34 when the door glass 34 is in the closed position. Specifically, the door glass 34 is displaced in a vehicle lateral direction into the second finger portion 81 and tip portion 83 of the exterior side portion 80 of the sealing member body 74 within the glass run channel 58. The displacement of the door glass 34 pivotally engages the tip portion 83 and the second finger portion 81 into the exterior surface of the door glass 34. This engagement compresses the sealing member body against the door glass 34 so to form a compression seal in the glass run channel 58. The compression seal can reduce the amount of vibration transmitting through the door glass and can improve the aerodynamic efficiency of the vehicle While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a vehicle door, the vehicle door comprising a door glass slidably attached to the vehicle door;
    a control unit; and
    an actuator assembly operably connected to the control unit, the actuator assembly comprising a motor housing and a plunger, the plunger operably coupled to the motor housing such that the plunger is movable between a retracted configuration and an extended configuration,
    wherein the actuator is activated by the control unit to move the plunger when the door glass is in a closed position,
    wherein the plunger of the actuator assembly is configured to make contact with the door glass to displace the door glass in a vehicle lateral direction in the extended configuration and is disengaged from the door glass in the retracted configuration.

2. The vehicle of claim 1, wherein the vehicle door comprises a door frame portion and a door frame cover portion that together define a cavity, the actuator assembly being mounted within the cavity.

3. The vehicle of claim 2, wherein a free end of the plunger is operably attached to a bar that extends along an edge of the door glass, the bar is configured to make contact with the door glass to displace the door glass in a vehicle lateral direction.

4. The vehicle of claim 3, wherein the bar is connected to multiple actuator assemblies.

5. The vehicle of claim 1, wherein the actuator extends the plunger a distance to apply a force against a plurality of predetermined positions on the door glass that moves an edge of the door glass laterally.

6. The vehicle of claim 5, further comprising glass run channel that receives an edge of the door glass with the door glass in the closed position, the glass run channel having a glass run sealing member located therein, the actuator assembly displaces the edge of the door glass into the glass run sealing member.

7. The vehicle of claim 1, wherein the actuator and plunger are activated only by the control unit when the door glass is in a closed position.

8. The vehicle of claim 7, wherein a window regulator is operably connected to the control unit, the window regulator provides the control unit an indication of the door glass position.

9. The vehicle of claim 1, wherein there is a plurality of actuator assemblies located about a periphery of the door glass.

10. A vehicle door comprising a door glass slidably attached to the vehicle door, the vehicle door comprising:
    a control unit; and
    an actuator assembly operably connected to the control unit, the actuator assembly having a motor housing and a plunger, the plunger extends from the motor housing, the plunger having a first end and a second end, the first end of the plunger is operably coupled to the motor housing, the second end of the plunger is configured to make contact with the door glass;
    wherein the second end of the plunger is moved from a retracted configuration that is disengaged with the door glass to an extended configuration when the door glass is in a closed position, the second end of the plunger is configured to apply a force against a position on the door glass upon an actuation by the actuator assembly that displaces the door glass in a vehicle lateral direction.

11. The door of claim 10, wherein the actuator and plunger are activated only by the control unit when the door glass is in a closed position.

12. The door of claim 10, wherein a window regulator is operably connected to the control unit, the window regulator provides the control unit an indication of the door glass position.

13. The door of claim 10, further comprising a glass run channel that receives an edge of the door glass with the door glass in the closed position, the glass run channel having a glass run sealing member located therein, the actuator assembly displaces the edge of the door glass into the glass run sealing member.

14. The door of claim 10, wherein the second end of the plunger is operably attached to a bar that extends along an edge of the door glass, the bar is configured to make contact with the door glass to displace the door glass in a vehicle lateral direction.

15. A method of damping a door glass of a vehicle door, the method comprising:
   mounting an actuator assembly having a motor housing and a plunger in a cavity defined by a door frame portion and a door frame cover portion;
   determining, by a control unit, when the door glass is in a closed position;
   activating the actuator assembly when the door glass is determined to be in the closed position moving from a retracted configuration that is disengaged with the door glass; and
   extending the plunger a distance to apply a force against a plurality of predetermined positions on the door glass that moves an edge of the door glass in a vehicle lateral direction.

16. The method of claim 15, the door further comprising a glass run channel that receives an edge of the door glass with the door glass in the closed position, the glass run channel having a glass run sealing member located therein, the plunger displaces the edge of the door glass into the glass run sealing member.

17. The method of claim 15, a free end of the plunger is operably attached to a bar that extends along an edge of the door glass, the bar is configured to make contact with the door glass to displace the door glass in a vehicle lateral direction.

18. The method of claim 17, wherein the bar is connected to multiple actuator assemblies.

19. The method of claim 15, wherein there is a plurality of actuator assemblies located about a periphery of the door glass.

20. The method of claim 15, wherein a window regulator is operably connected to the control unit, the window regulator provides the control unit an indication of the door glass position.

* * * * *